United States Patent [19]

Chamberlain

[11] 3,896,330

[45] July 22, 1975

[54] COLOR TELEVISION DEGAUSSING CIRCUIT

[75] Inventor: Richard Travers Chamberlain, Arlington Heights, Ill.

[73] Assignee: Admiral Corporation, Chicago, Ill.

[22] Filed: Sept. 28, 1970

[21] Appl. No.: 76,022

[52] U.S. Cl. .................... 315/8; 317/157.5; 358/10

[51] Int. Cl..... H01j 31/20; H01f 13/00; H01j 29/98

[58] Field of Search.................... 315/8; 178/5.4 TE

[56] References Cited

UNITED STATES PATENTS 3,404,222 10/1968 Rupley.......................... 178/5.4 TE

*Primary Examiner*—Robert Segal

[57] ABSTRACT

A degaussing circuit for a television receiver is disclosed including means to provide manually controlled or automatic degaussing of a color cathode ray tube and means for visually displaying on the television screen the effect of the degaussing action. In normal operation, automatic degaussing is accomplished each time the receiver is turned on, without an accompanying visual display. When a manual switch is closed to initiate degaussing during receiver operation, a boost voltage is removed from green and blue screen controls of the color tube contemporaneously with the energizing of the degaussing means. A predominantly red field remains on the face of the picture tube. Because a single color predominates, the degaussing action is clearly visible; when the degaussing is complete a pure red field appears on the tube face, indicating the completion of degaussing action and the purity condition of the tube.

6 Claims, 1 Drawing Figure

PATENTED JUL 22 1975
3,896,330
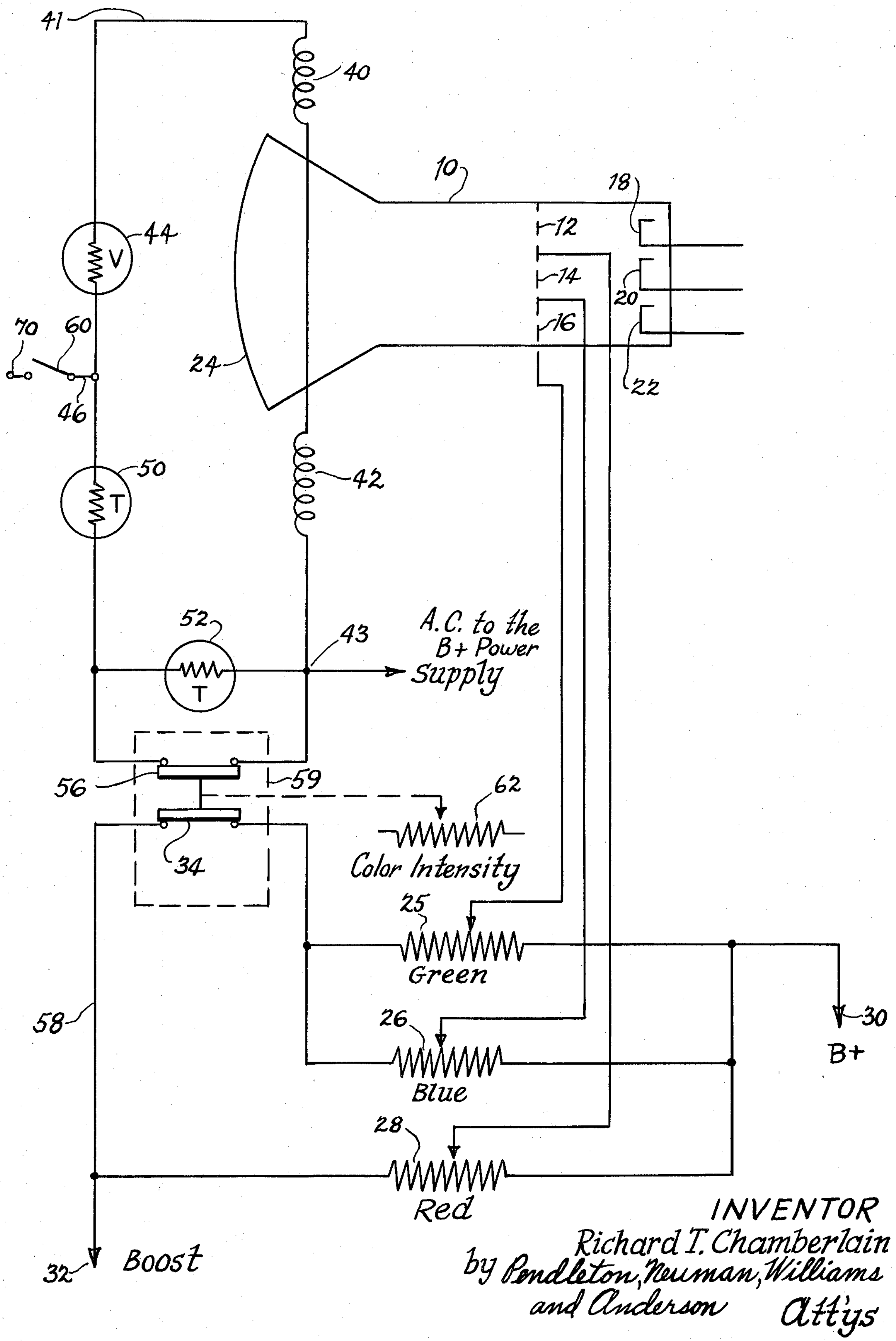
INVENTOR
Richard T. Chamberlain
by Pendleton, Neuman, Williams and Anderson Att'ys

COLOR TELEVISION DEGAUSSING CIRCUIT

FIELD OF THE INVENTION

This invention is directed generally to a color television receiver circuit and more particularly to a degaussing circuit used in conjunction with a color broadcast cathode ray tube.

BACKGROUND OF THE INVENTION

It is a well recognized problem in color television receivers that the paths of the electron beams in a typical three gun color picture tube are highly critical and extremely sensitive to external magnetic influences. These external magnetic influences may include the magnetic fields induced in the tube's metallic mask and supporting structure, as well as in other metal parts used in conjunction with a shadow mask type of picture tube. The magnetization is effected by bringing the picture tube into proximity with devices such as electric motors which create a magnetic field, or moving the tube physically through the earth's magnetic field. The effect on the picture tube is to alter the electron beam landing on the phosphor screen, resulting in color contamination, impurities and in extreme cases completely wrong colors.

When the metal components associated with a picture tube are magnetized and the electron beam landings are displaced, the most obvious method of correcting the problem is to demagnetize the affected components. To maintain the receiver in peak operating condition without the expense and inconvenience of repeated service calls, self-contained degaussing means should be incorporated in a color television receiver. Circuits for automatically degaussing a color television receiver are disclosed in U.S. Pat. Nos. 3,322;998; 3,344,307; 3,324,344; and 2,962,622. None of the circuits disclosed, however, include a manual degaussing feature which would allow the receiver to be degaussed at the option of the viewer; nor do prior art degaussing circuits include a visual display of the degaussing sequence, thereby providing means for monitoring the purity of the picture.

SUMMARY OF THE INVENTION

It is an object of this invention to provide degaussing means including a manual control enabling the user to degauss the picture tube periodically as required.

It is another object of this invention to provide a visual representation of the effect of degaussing on the accuracy of cathode ray tube beam landing on the screen of a color television tube.

It is a further object to provide means for demonstrating the effect of degaussing to a user of the television receiver.

It is still a further object to provide a viewer with means for checking the purity of the picture on a television receiver.

Briefly, these objects are accomplished by a degaussing circuit which establishes a magnetic field in a picture tube and then diminishes the field to zero, the circuit being manually controlled so that the degaussing operation may be initiated at any time. Visual display means are incorporated in the degaussing circuit to impose a field of a single color on the face of the television tube during the degaussing operation, so that the purity of the television picture following degaussing is clearly evident.

DESCRIPTION OF A PREFERRED EMBODIMENT

Referring now to the drawing, an embodiment of a degaussing circuit is shown which is constructed in accordance with the teachings of the present invention. The circuit includes means for visually displaying the effect of the degaussing circuit on the purity of the television picture. The voltages mentioned herein are for an exemplary embodiment, and are not intended to be limiting in any way.

A cathode ray tube 10 of conventional design is shown including screen grids 12, 14 and 16. The screen grids drive the red, blue and green guns, 18, 20 and 22 respectively, to supply color signals to a screen 24. The screen grids 12, 14 and 16 are connected through potentiometers 25, 26 and 28 respectively, to sources of positive potential which provide the necessary screen voltages. The potentiometers are adjusted to supply different screen voltages to each screen, thereby compensating for the varying efficiencies of the three different color phosphors on screen 24. A first source of positive potential marked B+, 30, supplies a voltage of 330 volts to the screen control potentiometers. A second source of positive potential marked B boost, 32, is coupled through a switch 34 to the green screen control potentiometer 25 and the blue screen control potentiometer 26. The boost voltage supply 32 is directly connected to red screen control potentiometer 28. The boost voltage 32 is a positive voltage of between 800 and 1,200 volts; the magnitude depends on the power output desired of a given receiver.

The means for degaussing the picture tube 10 include degaussing coils 40 and 42 connected to the power supply line 41 of the television receiver. The coils 40 and 42 are connected in series from a terminal 43 through a voltage dependent resistor 44 to a 120 volt AC input terminal 46. Two serially connected temperature dependent resistors (thermistors) 50 and 52 are connected from AC terminal 46 to terminal 43, thereby being in parallel with the coils 40 and 42 and voltage dependent resistor 44. The thermistors have a high resistance when cool, but have a relatively low resistance when hot. In contrast, the voltage dependent resistor has a relative low resistance when a high voltage is impressed across it, and a high resistance when the voltage is low. As used in this circuit, the resistive characteristics of resistor 44 and thermistors 50 and 52 are reciprocal in nature.

A normally closed switch 56 is connected in parallel with thermistor 52. Switch 56 is directly mechanically coupled to normally closed switch 34 which is interposed in boost voltage supply lead 58. The state of switches 34 and 56 is determined by a single control 59 which may be incorporated in any convenient control knob of a television control panel. In this specific embodiment, a rotary switch is incorporated in the receiver's color control, represented by potentiometer 62.

A degaussing sequence is carried out automatically each time the television receiver is turned on. At the start of the automatic degaussing sequence, the thermistor 50 is cold i.e., room temperature, and has a relatively high resistance. Immediately upon closure of power switch 60, which is the on/off switch on the television receiver, current begins to flow from AC input terminal 46 through thermistor 50 and normally closed switch 56 to power supply terminal 43. Because the resistance of thermistor 50 is initially high, a large voltage drop appears across the thermistor. As a consequence of this large voltage drop, the resistance of voltage dependent resistor 44 is quite low, causing an alternating current of large amplitude to flow through degaussing coils 40 and 42. Thus a large magnetic field is generated within picture tube 10.

The current flow through thermistor 50 causes the thermistor to warm up, decreasing its resistance and reducing the voltage drop across it. Consequently, the voltage drop across voltage dependent resistor 44 decreases, and its resistance increases. Thus the rate of current flow through the magnetizing degaussing coils 40 and 42 is reduced. Concomitantly, the strength of the magnetic field within picture tube 10 decreases at a rate determined by the characteristics of thermistor 50 and voltage dependent resistor 44. After the television receiver has operated for a short time, the thermistor 50 heats to a degree that its resistance is very low and the consequent voltage drop across it is very small. Since the voltage drop across the voltage dependent resistor 44 in parallel with thermistor 50 is also very small, its resistance is quite large. Thus the current through the magnetic field generating coils 40 and 42 is reduced to a negligible level. The coils are now effectively de-energized and they generate no significant field within the picture tube 10. The full operating current is now supplied directly to power supply terminal 43 and thence to other sections of the receiver chassis.

It may be desirable to repeat the degaussing operation while the set is operating, e.g., if the set is moved and thereby reoriented in the earth's magnetic field, or accidentally bumped or jarred. Thermistor 50 cannot be used to control this second degaussing operation without turning the receiver off and allowing this thermistor time to cool off. To overcome this problem, manual degaussing control 59 opens switch 56 thereby inserting normally bypassed thermistor 52 in series with thermistor 50. Thermistor 52 now performs the functions ascribed to thermistor 50 in the degaussing sequence described above. The resistance of thermistor 50 itself is negligible, and does not affect the degaussing circuit's function. Thus the circuit of this invention provides means for manual degaussing as well as automatic degaussing of the picture tube.

It may be desirable to visually display the effect of degaussing on the purity of the television picture. This may be done to demonstrate the effectiveness of the degaussing system, or to check that the desired color purity has been achieved.

The controlling element in the visual display means is a switch 34, which is mechanically linked to the switch 56. When the receiver is operating normally, both switches 56 and 34 are closed. When degaussing is manually initiated, full CCW rotation of control 62 removes color information from the display, and opens switches 34 and 56. Opening switch 34 cuts off the boost voltage supply 32 from green and blue screen controls 28 and 26 so that power is supplied to the blue and green screen control grids at a reduced level. However the boost voltage supply 32 is directly connected to red screen control 25. Thus the red screen grid continues to receive full power, and a predominantly red field appears on the face 24 of the tube 10. Since this single color predominates, the degaussing action is plainly visible. When the degaussing action is complete, a homogeneous red field remains indicating the purity of the picture tube. The switch 59 may now be closed, restoring the receiver to normal operation.

What is described herein is a circuit providing both manual and automatic degaussing of a television receiver together with means for visually displaying the effect of the degaussing circuit.

While a particular embodiment of this invention has been shown, it is to be understood that the invention is not limited thereto, since many modifications may be made which fall within the true spirit and scope of this invention.

The invention having thus been described, what is claimed and desired to be secured by Letters Patent is:

1. In a color television receiver having a picture tube susceptible to the effect of external magnetic fields, an electric circuit comprising: degaussing means positioned adjacent to the picture tube for degaussing the same, means for connecting the degaussing means to a power supply, circuit means connected to the degaussing means for causing a relatively large current to be passed from the power supply through the degaussing means for the time interval needed to degauss the picture tube, display circuit means for controlling the color of the field displayed on the picture tube, manual means for triggering operation of the degaussing circuit means to initiate a degaussing action, and said manual means substantially simultaneously with the triggering function also producing a change in the normal operation of the display circuit means of such character as to cause a visual effect of the degaussing action to appear on the picture tube.

2. The device of claim 1 wherein said degaussing means includes a degaussing coil and said degaussing circuit includes a voltage dependent resistor and first and second temperature dependent resistors connected in series, said first and second temperature dependent resistors being in parallel with said series connected coil and resistor; and wherein said manual means includes a manually controlled switch in parallel with said second temperature dependent resistor having a first closed position adapted for normal receiver operation in which a short is placed across said second temperature dependent resistor and a second open position adapted for manually initiated degaussing of the picture tube in which said second temperature dependent resistor is adapted to assume the function of said first temperature dependent resistor in degaussing said picture tube.

3. The circuit of claim 2 wherein said display means include voltage supply connections and first and second screen grid controls connected to the picture tube, said first screen grid controls being directly connected to said voltage supply connections; and wherein said switch means further includes a second manually controlled switch mechanically linked to said first manual switch and disposed between the voltage supply connections and said second screen controls, said manual switch having a first position adapted to connect said second screen controls to said voltage supply connections during normal operation, and having a second position adapted to cut off said second screen controls from said voltage supply connections so that the effect of manual degaussing of the picture tube is displayed on the face of the tube.

4. The device of claim 3 wherein said first screen control includes a single screen control grid adapted to display a field of a single color on the face of the picture tube during manually initiated degaussing of the picture tube.

5. A color television receiver including a picture tube susceptible to external magnetic fields, input terminals adapted to be connected to an AC power source, degaussing means coupled to said input terminals located adjacent to said picture tube, a voltage dependent resistor connected in series with said degaussing means, first and second serially connected temperature dependent resistors in parallel with said degaussing means and control means including a manual degaussing control switch and having two distinct operating modes, said control means normally operating in said first mode wherein said manual switch is closed and adapted to place a short across said second temperature dependent resistor whereby said degaussing means are subjected to an alternating current of decreasing amplitude determined by the characteristics of said voltage dependent resistor and said first temperature dependent resistor, said control means having a second operating mode wherein said manual switch is open so that said degaussing means are subjected to a current of decreasing amplitude determined by said voltage dependent resistor and said second temperature dependent resistor.

6. The device of claim 5 wherein said receiver further includes means for visually displaying the effect of said degaussing means on said picture tube including screen grid voltage controls, and voltage source connections coupled to said display means; and wherein said control means includes a second switch mechanically linked to said first switch, said second switch being disposed between said voltage connections and all but one of said screen voltage controls and being adapted to disconnect all but one of said screen voltage controls from the voltage source when said control means is in said second operating mode so that a field of a single color is displayed on the screen.

* * * * *

UNITED STATES PATENT OFFICE
CERTIFICATE OF CORRECTION

PATENT NO. : 3,896,330

DATED : July 22, 1975

INVENTOR(S) : Richard Travers Chamberlain

It is certified that error appears in the above-identified patent and that said Letters Patent are hereby corrected as shown below:

Column 4, Line 23, delete "the time interval needed to degauss the picture tube," and insert --a predetermined time interval,--.

Signed and Sealed this

Second Day of November 1976

[SEAL]

*Attest:*

RUTH C. MASON
*Attesting Officer*

C. MARSHALL DANN
*Commissioner of Patents and Trademarks*